US 7,052,539 B2

United States Patent
Okumura et al.

(10) Patent No.: US 7,052,539 B2
(45) Date of Patent: May 30, 2006

(54) SURFACE-TREATING AGENTS, ANTI-FOGGING SHEETS, AND TRAYS USING THEREOF

(75) Inventors: Yasuo Okumura, Himeji (JP); Osamu Jigami, Himeji (JP)

(73) Assignee: Daicel Polymer, Ltd., Tokyo (JP)

( * ) Notice: Subject to any disclaimer, the term of this patent is extended or adjusted under 35 U.S.C. 154(b) by 88 days.

(21) Appl. No.: 10/749,520

(22) Filed: Jan. 2, 2004

(65) Prior Publication Data

US 2004/0142186 A1 Jul. 22, 2004

(30) Foreign Application Priority Data

Jan. 16, 2003 (JP) ............................. 2003-008887

(51) Int. Cl.
 *C09D 101/08* (2006.01)
(52) U.S. Cl. .............................. 106/153.1; 156/156.4; 156/156.5; 156/164.44; 156/219; 156/285; 525/431; 525/434
(58) Field of Classification Search ................ 106/13, 106/219, 285, 153.1, 156.4, 156.5, 164.44; 525/431, 434
See application file for complete search history.

(56) References Cited

U.S. PATENT DOCUMENTS

| 4,486,552 | A | * | 12/1984 | Niemann ..................... 523/169 |
| 6,800,368 | B1 | * | 10/2004 | Shigehiro et al. ........... 428/403 |
| 6,838,186 | B1 | * | 1/2005 | Aral et al. ................... 428/516 |

| 2004/0197506 | A1 | * | 10/2004 | Okumura ..................... 428/35.7 |

FOREIGN PATENT DOCUMENTS

| JP | 53-115781 | | 10/1978 |
| JP | 56-166234 | A | 12/1981 |
| JP | 63-62538 | B2 | 12/1988 |
| JP | 5-287097 | A | 11/1993 |
| JP | 10-309785 | A | 11/1998 |
| JP | 2001-171052 | A | 6/2001 |
| JP | 3241797 | B2 | 10/2001 |
| JP | 2002-12686 | A | 1/2002 |
| JP | 2002-46232 | A | 2/2002 |
| JP | 2002-47366 | A | 2/2002 |
| JP | 2002-086639 | A | 3/2002 |

\* cited by examiner

*Primary Examiner*—H. Thi Le
(74) *Attorney, Agent, or Firm*—Birch, Stewart, Kolasch & Birch, LLP

(57) ABSTRACT

An anti-fogging tray is obtained by coating a styrenic resin sheet with an anti-fogging agent to mold a tray. The anti-fogging agent comprises 1 to 50 parts by weight of a non-ether-series hydrophilic polymer excluding a polyvinyl alcohol (e.g., a polyvinylpyrrolidone), 5 to 150 parts by weight of an ether-series hydrophilic polymer (e.g., polyoxyethylene-polyoxypropylene block copolymer, and a nonionic surfactant having an oxyethylene unit), and 1 to 50 parts by weight of a silicone oil relative to 100 parts by weight of a polyhydric alcohol fatty acid ester (e.g., a sucrose fatty acid ester, a polyglycerin fatty acid ester). A coating layer comprising a surface-treating agent may be formed on one side of the resin sheet, and a mold-releasing layer containing a component selected from the ether-series hydrophilic polymer and the silicone oil may be formed on the other side of the resin sheet.

4 Claims, No Drawings

SURFACE-TREATING AGENTS, ANTI-FOGGING SHEETS, AND TRAYS USING THEREOF

This Nonprovisional application claims priority under 35 U.S.C. § 119(a) on Patent Application No. 8887/2003 filed in JAPAN on Jan. 16, 2003, the entire contents of which are hereby incorporated by reference.

FIELD OF THE INVENTION

The present invention relates to surface-treating agents imparting high anti-fogging property and antistatic property, anti-fogging sheets treated with the surface-treating agents, and trays (or containers or vessels) formed with the sheets.

BACKGROUND OF THE INVENTION

Hydrophobic synthetic resin sheets such as styrenic resin sheets are inferior in anti-fogging property and antistatic property. Therefore, when such a sheet is shaped or molded into a tray to store a food, water vapor is attached to the surface of the tray as small droplets due to temperature and humidity changes. As a result, the tray gets clouded (misty or dim) thereby deteriorating transparency.

Japanese Patent Application Laid-Open No. 115781/1978 (JP-53-115781A) proposes the attachment of an anti-fogging agent (such as a surfactant or a polyvinyl alcohol) and a silicone oil to a thermoplastic resin film in which the surface of the film is treated by a corona discharge to give the surface tension of 40 to 55 dyn/cm. Japanese Patent Publication No. 62538/1988 (JP-63-62538B) discloses a method for coating a styrenic resin film with an aqueous solution comprising a sucrose fatty acid ester, a non-modified polyvinyl alcohol having a polymerization degree of not more than 800, and a silicone emulsion at a specific proportion. Japanese Patent Application Laid-Open No. 309785/1998 (JP-10-309785A) discloses a styrenic resin sheet in which one side of the sheet is coated with a mixture of a sucrose fatty acid ester and a methyl cellulose, the coated layer is further coated with a silicone oil, and the other side of the sheet is coated with a silicone oil. Furthermore, Japanese Patent No. 3241797 description discloses that at least one side of a polymer film is coated with a surface-treating agent comprising a sucrose fatty acid ester, a silicone emulsion, and a polysaccharide and/or a hydrophilic polymer (excluding a polyvinyl alcohol).

These anti-fogging sheets or films containing a silicone oil are excellent in antiblocking property. However, anti-fogging property of these anti-fogging sheets is not enough. That is, the anti-fogging sheets are, for example, low in anti-fogging property (anti-fogging property at high temperature) against water vapor generated from a high-temperature content which is put in a tray using the sheets, in particular low in anti-fogging property (anti-fogging property at low temperature) against water vapor or dew condensation when a content containing water (e.g., a food) is charged in a tray using the sheets and kept at a low temperature. Further, anti-fogging property is significantly deteriorated by rolling up the sheet, or shaping the sheet into a tray. That is, a resin sheet for shaping into a tray (e.g., a styrenic resin sheet) is, for example, formed by melt-kneading a resin, extrusion-molding the kneaded product to a sheet form, biaxially drawing the resultant sheet, coating an anti-fogging agent on the sheet, and drying the coated sheet to roll up in a roll form. Moreover, when shaping or molding a tray, the tray is shaped or molded by paying out the resin sheet from the roll, and thermoforming the sheet. However, along with rolling up of the resin sheet, the anti-fogging agent of the sheet is contacted with the non-treated surface of the resin sheet and transferred thereto. Further, in the process for shaping or molding the tray, probably because the anti-fogging agent is transferred by contacting with a heated member such as a hot plate, anti-fogging property or antiblocking property of the resin sheet or tray is remarkably decreased. In particular, in the case shaping or molding a tray by deep drawing, anti-fogging property is significantly deteriorated. Moreover, a molding machine to be used is stained with the anti-fogging agent. Further, a relatively large amount of silicone oil is necessary for increasing mold-releasing property of the anti-fogging sheet.

Japanese Patent Application Laid-Open No. 171052/2001 (JP-2001-171052A) discloses a styrenic resin sheet obtained by coating at least one side of the sheet with an antistatic agent at a coating amount of 2 to 30 mg/m$^2$, wherein the antistatic agent contains a fatty acid amide and a polyoxyethylene-polyoxypropylene block copolymer at a specific ratio. This document also describes that the antistatic agent further contains a silicone oil, and the coating amount of the silicone oil is 1 to 25 g/m$^2$. Japanese Patent Application Laid-Open No. 12686/2002 (JP-2002-12686A) discloses a resin sheet obtained by coating at least one side of the sheet with a coating composition at a specific quantitative relationship, wherein the coating composition comprises an fatty acid amide, a polyoxyethylene-polyoxypropylene block copolymer, a silicone oil, and a water-soluble blue coloring agent, and the fatty acid amide and the polyoxyethylene-polyoxypropylene block copolymer constitute an antistatic agent.

These styrenic resin sheets provide anti-fogging property along with antistatic property. However, these styrenic resin sheets are also lack in enough anti-fogging property (particularly low-temperature anti-fogging property). Moreover, in order to increase mold-releasing property of the sheets, a relatively large amount of silicone oil is required.

Japanese Patent Application Laid-Open No. 46232/2002 (JP-2002-46232A) discloses a polystyrenic sheet in which one surface is coated with at least one anti-fogging agent selected from the group consisting of a sucrose fatty acid ester and a polyglycerin fatty acid ester at a coating amount of 5 to 30 mg/m$^2$, and the other surface is coated with a mold-releasing agent comprising an ether-series polymer (a polyoxyethylene-polyoxypropylene block copolymer) and a non-block copolymeric ethylene oxide-series nonionic surfactant at a coating amount of 3 to 30 mg/m$^2$. In this document, there is described that, in the case where a silicone oil is used, electrostatic charges are opt to generate by friction between a metal mold and the sheet. Japanese Patent Application Laid-Open No. 47366/2002 (JP-2002-47366A) discloses a polystyrenic sheet in which one surface is coated with at least one anti-fogging agent selected from the group consisting of a sucrose fatty acid ester and a polyglycerin fatty acid ester at a coating amount of 5 to 30 mg/m$^2$, and the other surface is coated with a mold-releasing agent comprising an ether-series polymer (a polyoxyethylene-polyoxypropylene block copolymer, a polyethylene glycol) at a coating amount of 3 to 30 mg/m$^2$ Japanese Patent Application Laid-Open No. 86639/2002 (JP-2002-86639A) discloses a polystyrenic anti-fogging resin sheet in which one surface is coated with an anti-fogging agent comprising at least one fatty acid ester selected from the group consisting of a sucrose fatty acid ester and a polyglycerin fatty acid ester, an ether-series polymer (a polyoxyethylene-polyoxypropylene block copolymer, a polyethylene glycol), and a polyvinyl alcohol, and the other surface is coated with a mold-releasing agent comprising an ether-series polymer (a polyoxyethylene-polyoxypropylene block copolymer, a polyethylene glycol). These documents describe that use of a silicone oil deteriorates anti-fogging property and induces generation of electrostatic charges by friction.

However, since the ether-series polymer is used as the mold-releasing agent, these anti-fogging sheets are significantly deteriorated in antiblocking property or mold-releasing property compared with a sheet using a silicone oil. Further, in the case where the resin sheet is rolled up in a roll form or contacted with a heated member such as a hot plate in the forming process, anti-fogging property and transparency are adversely affected, and the quality of a tray formed with the sheet becomes low. Incidentally, Japanese Patent Application Laid-Open No. 86639/2002 (JP-2002-86639A) describes, as a comparative example, a styrenic resin sheet in which one side is coated with an anti-fogging agent comprising a sucrose fatty acid ester, a polyoxyethylene-polyoxypropylene block copolymer, a polyvinyl alcohol, and a silicone oil, and the other side is coated with a mold-releasing agent comprising a polyoxyethylene-polyoxypropylene block copolymer and a polyoxyethylene sorbitan laurate.

SUMMARY OF THE INVENTION

It is therefore an object of the present invention to provide a surface-treating agent having high anti-fogging property (or anti-fogging composition), a resin sheet having high anti-fogging property, and a tray (or container or vessel) using the sheet.

Another object of the present invention is to provide a surface-treating agent capable of maintaining high anti-fogging property and improving mold-releasing property (or antiblocking property) even in the steps such as rolling up, thermoforming or other step, and an anti-fogging resin sheet and a tray (or container or vessel) each using the surface-treating agent.

It is still another object of the present invention to provide a surface-treating agent capable of giving high mold-releasing property (or antiblocking property) even in the case using a silicone oil at a small amount, and an anti-fogging resin sheet and a tray (or container or vessel) each using the surface-treating agent.

The inventors of the present invention made intensive studies to achieve the above objects and finally found that, by coating a resin sheet with a fatty acid ester (such as a sucrose fatty acid ester), a non-ether-series hydrophilic polymer (such as a polyvinylpyrrolidone), an ether-series hydrophilic polymer having an oxyethylene unit (such as a polyoxyethylene-polyoxypropylene block copolymer), and a silicone oil in combination, the resin sheet can be prevented from tack or whitening with keeping transparency or luster thereof as well as can maintain high anti-fogging property even when the sheet is rolled up in a roll form or thermoformed (e.g., deep drawn). The present invention was accomplished based on the above findings.

That is, the surface-treating agent (or anti-fogging agent) of the present invention comprises a polyhydric alcohol fatty acid ester, a non-ether-series hydrophilic polymer excluding a polyvinyl alcohol, an ether-series hydrophilic polymer having at least an oxyethylene unit, and a silicone oil. The polyhydric alcohol fatty acid ester may be selected from various fatty acid esters, for example, a sucrose fatty acid ester, a polyglycerin fatty acid ester, and others. Moreover, the non-ether-series hydrophilic polymer may be selected from at least one member selected from the group consisting of a polysaccharide (including an oligosaccharide, a cellulose derivative), an acrylic polymer or a salt thereof, and a homo- or copolymer of vinylpyrrolidone. Further, the ether-series hydrophilic polymer may be selected from nonionic surfactants, for example, a polyoxyethylene-polyoxypropylene block copolymer, an adduct of ethylene oxide to a compound having an active hydrogen atom (a nonionic surfactant having an oxyethylene unit), and others. The silicone oil may be usually in the form of a silicone emulsion.

In the above-mentioned components, the proportions of the non-ether-series hydrophilic polymer, the ether-series hydrophilic polymer, and the silicone oil may for example be about 1 to 50 parts by weight, about 5 to 150 parts by weight, and about 1 to 50 parts by weight, respectively, relative to 100 parts by weight of the polyhydric alcohol fatty acid ester. More specifically, the proportions of the polyvinylpyrrolidone, the polyoxyethylene-polyoxypropylene block copolymer, and the silicone emulsion as a solid content may be about 5 to 25 parts by weight, about 20 to 100 parts by weight, and about 5 to 25 parts by weight, respectively, relative to 100 parts by weight of the fatty acid ester selected from a sucrose fatty acid ester and a polyglycerin fatty acid ester.

The present invention also includes a coated resin sheet (or anti-fogging resin sheet) comprising a resin sheet (e.g., a styrenic resin sheet) and a coating layer formed on at least one side of the resin sheet, wherein the coating layer comprises the surface-treating agent (or anti-fogging agent). The coating layer comprising the surface-treating agent may be formed on one side of the resin sheet, and a release layer may be formed on the other side of the resin sheet. The release layer may comprise various mold-releasing agent, for example, at least one member selected from the group consisting of an ether-series hydrophilic polymer having at least an oxyethylene unit, and a silicone oil. Moreover, in the case where the release layer comprises the ether-series hydrophilic polymer and the silicone oil, the proportion of the ether-series hydrophilic polymer may for example be about 10 to 500 parts by weight (e.g., about 10 to 200 parts by weight) relative to 100 parts by weight of the silicone oil.

The present invention further includes a process for producing a coated resin sheet, which comprises applying (or coating) the surface-treating agent on at least one side of a resin sheet; and a process for producing a coated resin sheet, which comprises applying (or coating) the resin sheet with the surface-treating agent, and rolling up the coated sheet in a roll form. Furthermore, the present invention includes a tray formed with the coated resin sheet.

Incidentally, throughout this description, the meaning of the term "sheet" includes a two-dimensional material, for example, a film, a plate, or others. The "ether-series hydrophilic polymer" also includes an ethylene oxide adduct whose molecular weight is increased by addition of ethylene oxide.

DETAILED DESCRIPTION OF THE INVENTION

[Surface-treating Agent (or Surface-treating Agent)]

The fatty acid ester constituting the surface-treating agent (or anti-fogging compound) of the present invention may comprise an ester of a polyhydric alcohol and a fatty acid (particularly a higher fatty acid). Examples of the polyhydric alcohol include a $C_{2-12}$alkylene glycol such as ethylene glycol, propylene glycol, butanediol, hexanediol, or neopentyl glycol; a (poly)oxy$C_{2-4}$alkylene glycol such as diethylene glycol, triethylene glycol, a polyethylene glycol, dipropylene glycol, tripropylene glycol, a polypropylene glycol, or a polytetramethylene glycol; a polyhydroxy compound (or polyhydric alcohol) such as glycerin, a polyglycerin having a polymerization degree of about 2 to 20 (e.g., diglycerin, triglycerin, tetraglycerin, polyglycerin), trimethylolethane, trimethylolpropane, pentaerythritol, or a saccharide (e.g., sucrose, sorbitol, mannitol, xylitol, maltitol, sorbitan, an oligosaccharide), and others. The polyhydric alcohol(s) may be used singly or in combination.

The preferred polyhydric alcohol includes a compound having not less than three hydroxyl groups, for example, glycerin, a polyglycerin having a polymerization degree of about 2 to 15, and a saccharide (e.g., sucrose).

The fatty acid includes, for example, a saturated $C_{6-30}$fatty acid such as caproic acid, caprylic acid, capric acid, lauric acid, myristic acid, palmitic acid, stearic acid, behenic acid, or montanic acid; an unsaturated $C_{10-24}$fatty acid such as linderic acid, palmitoleic acid, oleic acid, elaidic acid, isooleic acid, erucic acid, linoleic acid, or linolenic acid; and others. The fatty acid(s) may be used singly or in combination to form a mixed acid ester.

Among these fatty acids, a saturated or unsaturated $C_{8-24}$fatty acid, in particular a saturated fatty acid, is preferred. The fatty acid is often a fatty acid containing a $C_{10-22}$fatty acid as a main component (e.g., a fatty acid containing a saturated $C_{12-18}$fatty acid such as lauric acid at a proportion of at least not less than 50 mol %).

As the fatty acid ester useful for improving anti-fogging or other property (properties), a sucrose fatty acid ester, and a polyglycerin fatty acid ester are preferred. The fatty acid ester(s) may also be used singly or in combination. Examples of the sucrose fatty acid ester include a mono- to hexaester of sucrose and a saturated $C_{8-24}$fatty acid (particularly a saturated $C_{10-22}$fatty acid), e.g., a sucrose mono- to hexacaprylate, a sucrose mono- to hexalaurate, a sucrose mono- to hexastearate, and a sucrose mono- to hexabehenate; a mono-to hexaester of sucrose and an unsaturated $C_{12-24}$fatty acid (particularly an unsaturated $C_{16-22}$fatty acid), e.g., a sucrose mono- to hexaoleate; and others.

As the polyglycerin fatty acid ester, there may be mentioned a mono- to dodecaester of a polyglycerin having a polymerization degree of about 2 to 16 and a saturated $C_{8-24}$fatty acid (particularly a saturated $C_{10-22}$fatty acid), e.g., a tetraglycerin mono- to tetracaprylate, a hexaglycerin mono- to pentacaprylate, a decaglycerin mono-to decacaprylate, a tetraglycerin mono- to tetralaurate, a hexaglycerin mono- to pentalaurate, a decaglycerin mono- to decalaurate, a tetraglycerin mono- to tetrastearate, a hexaglycerin mono- to pentastearate, a decaglycerin mono- to decastearate, a tetraglycerin mono- to tetrabehenate, a hexaglycerin mono- to pentabehenate, and a decaglycerin mono- to decabehenate; a mono- to dodecaester of a polyglycerin having a polymerization degree of about 2 to 16 and an unsaturated $C_{16-24}$fatty acid (particularly an unsaturated $C_{16-22}$fatty acid), e.g., a tetraglycerin mono- to tetraoleate, a hexaglycerin mono-to pentaoleate, a decaglycerin mono- to decaoleate, a tetraglycerin mono- to tetraerucate, a hexaglycerin mono-to pentaerucate, and a decaglycerin mono- to decaerucate; or others.

The HLB (hydrophile-lipophile balance) of the fatty acid ester is not particularly limited, and may for example be about 2 to 20, preferably about 5 to 18, more preferably about 10 to 18, and usually about 12 to 17.

The non-ether-series hydrophilic polymer includes various hydrophilic polymers other than a polyvinyl alcohol, and for example, a polysaccharide (an oligosaccharide, a cellulose derivative), and a polymer of a vinyl monomer, or a salt thereof. The hydrophilic polymer(s) may be used singly or in combination.

Among the non-ether-series hydrophilic polymer(s), the polysaccharide may for example be a single polysaccharide, a complex (or combined) polysaccharide, or a derivative thereof. The polysaccharide includes, for example, a polysaccharide containing an oligosaccharide, a starch derivative, a cellulose derivative, and others. These polysaccharides are used as foods or food additives, and have high safety.

Examples of the polysaccharide include a starch, phytoglycogen, fructan, galactomannan, glucomannan, mannan, barley and oat glucan, cellulose, hemicellulose, β-1,3-glucan, galactan, araban, xylan, arabogalactan, araboxylan, araboglucan, pectin, gum acacia (or gum arabic), tragacanth gum, locust bean gum, guar gum, mesquite gum, carageenin, glucuronoxylan, laminaran, inulin, lichenin, fructosan, chitin, chitosan, alginic acid or a salt thereof (e.g., sodium alginate), hyaluronic acid, chondroitinsulfate, charoninsulfate, gelatin, agar, fucoidin, hibiscus, curdlan, xanthan gum, pullulan, dextran, cyclodextrin, nigeran, levan, and others. Incidentally, as the oligosaccharide (or oligosaccharide alcohol), there may be mentioned a disaccharide, a trisaccharide, a tetrasaccharide, a pentasaccharide, a hexasaccharide, a heptasaccharide, a octasaccharide, a decasaccharide, or others, and usually a oligosaccharide of a trisaccharide to a octasaccharide (e.g., tetrasaccharide). The oligosaccharide may be a simple saccharide, or may be used as an oligosaccharide containing a plurality of saccharides (e.g., containing at least a tetrasaccharide). Moreover, the oligosaccharide may contain a branched sugar alcohol.

The starch derivative includes, for example, white dextrin, yellow dextrin, british gum, an oxidized starch, an acid-treated starch, an α-starch, a highly amylose-containing starch, a dialdehyde starch, a starch acetate, a sodium glycolate starch, a hydroxyethyl starch, a phosphate starch, a cation starch, a crosslinked starch, an ester of a starch and an organic acid, an ester of a starch and an inorganic acid, an alkylated starch ether and an alkylated substituted starch ether, a graft-polymerized starch, and a derivative thereof.

Examples of the cellulose derivative include an alkylcellulose (e.g., a $C_{1-6}$alkylcellulose such as a methylcellulose, an ethylcellulose, or a propylcellulose), a hydroxyalkylalkylcellulose (e.g., a hydroxyethylmethylcellulose, a hydroxypropylmethylcellulose), a soluble cellulose acetate, an inorganic acid ester of a cellulose (e.g., a cellulose sulfate, a cellulose phosphate), and others.

Used as the polysaccharide is the oligosaccharide, or the cellulose derivative (e.g., an alkylcellulose, a carboxyalkylcellulose, a hydroxyalkylcellulose, a hydroxyalkylalkylcellulose) in many cases.

The hydrophilic polymer includes a water-soluble polymer, a water-dispersible polymer, and a water-swelling polymer. Examples of the hydrophilic polymer includes a homo- or copolymer containing a vinyl monomer (e.g., a hydroxyl group-containing monomer, a carboxyl group- or sulfonic acid group-containing monomer, an amide group-containing monomer, a monomer containing a basic nitrogen atom, or a vinyl ether-series monomer) as a constitutive component.

As the hydroxyl group-containing monomer, for example, there may be mentioned a hydroxyalkyl acrylate such as 2-hydroxyethyl acrylate, or 2-hydroxypropyl acrylate, a hydroxyalkyl methacrylate corresponding to the hydroxyalkyl acrylate, a polyethylene glycol mono(meth)acrylate, and others. The carboxyl group-containing monomer includes, for example, (meth)acrylic acid, maleic acid, fumaric acid, and itaconic acid. Examples of the sulfonic acid group-containing monomer include ethylenesulfonic acid, styrenesulfonic acid, and others. The amide group-containing monomer includes, for example, (meth)acrylamide, and the monomer containing a basic nitrogen atom includes, for example, N-dimethylaminoethyl acrylate, N-diethylaminoethyl acrylate, or a methacrylate corresponding thereto, and vinylpyrrolidone. As the vinyl ether-series monomer, there may be mentioned, for example, an alkyl vinyl ether such as vinyl methyl ether, vinyl ethyl ether, vinyl isopropyl ether, vinyl butyl ether, or vinyl isobutyl ether.

The hydrophilic polymer containing the monomer as a constitutive component may be a copolymer of the monomer and a monomer such as a (meth)acrylate (e.g., a $C_{1-10}$alkyl (meth)acrylate), styrene, or a vinyl carboxylate (e.g., vinyl acetate).

The preferred hydrophilic polymer includes a water-soluble polymer (e.g., an acrylic polymer, a vinyl-series polymer). For example, such a polymer is preferably a polymer having a carboxyl group or a salt thereof [e.g., a (meth)acrylic polymer and a salt thereof, such as a poly((meth)acrylic acid), a (meth)acrylic acid-maleic anhydride copolymer, a (meth)acrylic acid-vinylsulfonic acid copolymer, or a (meth)acrylic acid-methyl methacrylate copolymer], a vinyl-series polymer containing an ether group or basic nitrogen atom [e.g., a polyvinylether, a vinyl ether-maleic anhydride copolymer, or a polymer (homo- or copolymer) having a vinylpyrrolidone unit such as a polyvinylpyrrolidone]. Examples of the salt of the (meth)acrylic polymer include an alkali metal salt such as a sodium salt or a potassium salt, an ammonium salt, and an organic amine salt.

Among the hydrophilic polymers, a (meth)acrylic polymer or a salt thereof (an acrylic polymer or a salt thereof, e.g., a sodium polyacrylate), and a homo- or copolymer of vinylpyrrolidone (e.g., a polyvinylpyrrolidone) which are approved as a food additive are preferred.

The ether-series hydrophilic polymer may have at least an oxyethylene unit, and includes an ethylene oxide adduct, a random or block polymer of ethylene oxide, or others. The ether-series hydrophilic polymer has surface-active property in many cases. The representative ether-series hydrophilic polymer includes a polyoxyethylene-polyoxypropylene block copolymer (hereinafter, may be sometimes simply referred to as a POE-POP block copolymer), and a nonionic surfactant containing an oxyethylene unit. The ether-series hydrophilic polymer(s) may be used singly or in combination.

The polyoxyethylene-polyoxypropylene block copolymer (POE-POP block copolymer) is a copolymer comprising both an oxyethylene block (unit) —$(CH_2CH_2O)_m$— and an oxypropylene block (unit) —$(CH(CH_3)CH_2O)_n$—, and the content $[m/(m+n)\times100]$ of the ethylene oxide chain in the copolymer may be about 10 to 95% (wt. %) (preferably about 20 to 90% (wt. %), more preferably about 40 to 90% (wt. %), and particularly about 50 to 90% (wt. %)). The block structure of the block copolymer is not particularly limited, and may be a diblock structure formed with an oxyethylene block and an oxypropylene block, a triblock structure formed by bonding an oxyethylene block to the both ends of an oxypropylene block, and others. The copolymer having the triblock structure may be represented by the following formula:

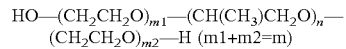
$(CH_2CH_2O)_{m2}$—H (m1+m2=m)

The molecular weight of the polyoxyethylene-polyoxypropylene block copolymer (POE-POP block copolymer) is not particularly limited. The weight-average molecular weight thereof may for example be selected within a range from about 1,000 to 50,000, preferably about 3,000 to 30,000, and more preferably 5,000 to 30,000 (e.g., about 10,000 to 25,000), and may be usually about 8,000 to 20,000 (e.g., about 10,000 to 20,000).

Examples of the nonionic surfactant include a polyoxyethylene alkyl ether (e.g., a polyoxyethylene $C_{12-24}$alkyl ether), a polyoxyethylene alkyl aryl ether (e.g., a polyoxyethylene $C_{6-18}$alkyl phenyl ether), a polyoxyethylene polyhydric alcohol fatty acid ester (an adduct of ethylene oxide to a polyhydric alcohol fatty acid ester) (e.g., a polyoxyethylene sorbitan fatty acid ester, a polyoxyethylene glycerin fatty acid ester, a polyoxyethylene sorbitol fatty acid ester, a polyoxyethylene castor oil), a polyoxyethylene alkylamine (e.g., a polyoxyethylene $C_{10-24}$alkylamine), and a polyoxyethylene fatty acid amide (e.g., a polyoxyethylene $C_{8-24}$fatty acid amide). The nonionic surfactant(s) may be used singly or in combination. As the nonionic surfactant, the polyoxyethylene polyhydric alcohol fatty acid ester (e.g., the polyoxyethylene sorbitan fatty acid ester) is usually employed. Incidentally, the higher fatty acid (the $C_{6-30}$saturated fatty acid, the $C_{10-24}$unsaturated fatty acid) described in the paragraph of the fatty acid ester may be utilized as the fatty acid.

In the nonionic surfactant, the mole number of the adducted oxyethylene unit may be about 2 to 100, preferably about 5 to 50 (e.g., about 10 to 50), and more preferably about 10 to 30. Further, the HLB of the nonionic surfactant may for example be about 5 to 20, and preferably about 10 to 20 (e.g., about 10 to 18).

In the present invention, a silicone oil having high antiblocking property or mold-releasing property is utilized. The species of the silicone oil is not particularly limited, and the silicone oil include, for example, an alkylpolysiloxane such as a dimethylpolysiloxane, a diethylpolysiloxane, or a trifluoropropylpolysiloxane; an arylpolysiloxane such as a diphenylpolysiloxane; an alkylarylpolysiloxane such as a methylphenylpolysiloxane; or others. The silicone oil may be a chain (or linear) polysiloxane, or a cyclic polysiloxane.

Further, the silicone oil may be a modified silicone oil as far as the silicone oil ensures antiblocking property or mold-releasing property. Example of the modified silicone oil include a silicone oil having a hydroxyalkyl group (e.g., a hydroxy $C_{2-4}$alkyl group such as hydroxyethyl group), a polyoxyalkylene group, an amino group, a N-alkylamino group, a glycidyl group or epoxy group, or a polymerizable group (e.g., vinyl group, (meth)acryloyl group).

The silicone oil(s) may be also used singly or in combination. Among these silicone oils, a general-purpose dimethylpolysiloxane is usually employed. The silicone oil may be in various forms, and usually employed in the form of a silicone emulsion (a emulsion formed by emulsifying and dispersing a silicone oil) in practical cases.

The viscosity of the silicone oil is not particularly limited, and for example, the Ostwald viscosity at a room temperature (15 to 25° C.) is about 50 to 50000 centistokes ($0.5\times10^{-4}$ to $500\times10^{-4}$ m$^2$/s), preferably about 100 to 30000 centistokes ($1\times10^{-4}$ to $300\times10^{-4}$ m²/s), and more preferably about 150 to 30000 centistokes ($1.5\times10^{-4}$ to $300\times10^{-4}$ m²/s).

In the surface-treating agent of the present invention, each component may be used in combination in such a range that anti-fogging property or antiblocking property (or mold-releasing property) is adversely affected. As such a combination, there may be mentioned, for example, the following combination: at least one fatty acid ester selected from the group consisting of a sucrose fatty acid ester and a polyglycerin fatty acid ester (in particular a fatty acid ester comprising at least a sucrose fatty acid ester); at least one non-ether-series polymer selected from the group consisting of a polysaccharide, an acrylic polymer or a salt thereof, and a homo- or copolymer of vinylpyrrolidone (in particular a non-ether-series polymer comprising at least a homo- or copolymer of vinylpyrrolidone); at least one ether-series hydrophilic polymer selected from the group consisting of a polyoxyethylene-polyoxypropylene block copolymer, and a nonionic surfactant having an oxyethylene unit (in particular an ether-series hydrophilic polymer comprising at least a polyoxyethylene-polyoxypropylene block copolymer); and a silicone oil (in particular an emulsion of silicone such as a dimethylpolysiloxane).

In the surface-treating agent (or anti-fogging agent) of the present invention, the proportion of each component may be selected so that anti-fogging property or antiblocking property (or mold-releasing property) is deteriorated. The proportion of the non-ether-series hydrophilic polymer (e.g., a polyvinylpyrrolidone) may for example be about 1 to 50 parts by weight, preferably about 5 to 30 parts by weight, and more preferably about 5 to 20 parts by weight (e.g., about 5 to 15 parts by weight) relative to 100 parts by weight of the polyhydric alcohol fatty acid ester (e.g., a sucrose fatty acid ester, a polyglycerin fatty acid ester). The amount of the ether-series hydrophilic polymer (e.g., a POE-POP block copolymer) relative to 100 parts by weight of the polyhydric alcohol fatty acid ester may for example be about 5 to 150 parts by weight, preferably about 10 to 100 parts by weight (e.g., about 20 to 80 parts by weight), and more preferably about 20 to 100 parts by weight (e.g., about 20 to 75 parts by weight), and is usually about 20 to 50 parts by weight. The amount of the silicone oil may for example be about 1 to 50 parts by weight, preferably about 5 to 30 parts by weight (e.g., about 5 to 25 parts by weight), more preferably about 5 to 20 parts by weight (e.g., about 5 to 15 parts by weight) relative to 100 parts by weight of the polyhydric alcohol fatty acid ester. According to the present invention, even when the amount of the silicone oil is small, both high antiblocking property and mold-releasing property can be obtained.

Incidentally, each component may be used singly or in combination. In the case where a plurality of components are used in combination, the proportion of a second component relative to 100 parts by weight of a first component may be about 0.1 to 1000 parts by weight (e.g., about 1 to 500 parts by weight, and preferably about 5 to 250 parts by weight). For instance, in the case using the sucrose fatty acid ester and the polyglycerin fatty acid ester in combination as the polyhydric alcohol fatty acid ester, the proportion of the latter component may for example selected from a range of about 1 to 500 parts by weight (e.g., about 5 to 300 parts by weight, and preferably about 5 to 100 parts by weight) relative to 100 parts by weight the former component. When the POE-POP block copolymer and the nonionic surfactant having an oxyethylene unit are used in combination as the ether-series hydrophilic polymer, the proportion of the both components may be selected from a wide range. For example, the proportion of the latter component may be selected from a range of about 0.1 to 1000 parts by weight (e.g., about 1 to 500 parts by weight, and preferably about 10 to 250 parts by weight) relative to 100 parts by weight of the former component.

Incidentally, the surface-treating agent may comprise various additives, for example, a stabilizer (e.g., an antioxidant, a ultraviolet ray absorbing agent), a filler, a coloring agent, an antistatic agent, a flame retardant, a lubricant, a wax, an antiseptic agent (or preservative), a viscosity adjustment (or viscosity controller), a thickening agent, a leveling agent, and an antifoaming agent. Moreover, the surface-treating agent may be usually employed in an embodiment such as coating liquid or an impregnating liquid, and may be a nonaqueous liquid composition containing an organic solvent as a solvent. The surface-treating agent may be usually utilized as an aqueous composition. Incidentally, in the aqueous composition, the solvent may be water alone, or a mixed solvent of water and a hydrophilic solvent (particularly a water-miscible solvent) [for example, an alcohol (e.g., methanol, ethanol, isopropanol), a ketone (e.g., acetone), an ether (e.g., dioxane, tetrahydrofuran), a cellosolve (e.g., methylcellosolve, ethylcellosolve, butylcellosolve), a carbitol].

The surface-treating agent may be prepared by a conventional mixing and stirring machine or mixing and dispersing machine. On the preparation, the silicone oil may be dispersed. The viscosity of the surface-treating agent may be suitably selected so that coating property is deteriorated. The viscosity of the surface-treating agent may for example be not more than 5000 cps (=5 Pa·s) [preferably about 100 to 3000 cps (=0.1 to 3.0 Pa·s, and more preferably about 10 to 2500 cps (=0.01 to 2.5 Pa·s)].

[Coated Resin Sheet or anti-Fogging Sheet, and Process for Producing the Same]

The coated resin sheet of the present invention comprises a resin sheet, the surface-treating agent for coating at least one side (one side or both sides) of the resin sheet to form a coating layer (or covering layer).

The resin sheet may be formed from various thermoplastic resins having film- or sheet-formability (or shapability), for example, an olefinic resin such as a polyethylene-series resin (e.g., a polyethylene, an ethylene-ethyl acrylate copolymer, an ionomer), a polypropylene-series resin (e.g., a polypropylene, a propylene-ethylene copolymer), or a poly(4-methylpentene-1); a vinyl alcohol-series resin such as a polyvinyl alcohol, or a ethylene-vinyl alcohol copolymer; a vinyl chloride-series resin such as a polyvinyl chloride; a styrenic resin; a homo- or copolyester-series resin having an alkylene arylate unit, such as a polyethylene terephthalate or a polybutylene terephthalate; a nylon or polyamide-series resin; a polyacrylonitrile-series resin; a polycarbonate-series resin; a polyphenylene oxide-series resin; a polysulfone-series resin; and a cellulose derivative. The resin(s) may be used singly or in combination. Moreover, the resin sheet may be a single layer sheet, or a laminated sheet formed by laminating a plurality of resin layers. The thickness of the resin sheet may be selected depending on the application, and may for example be about 10 μm to 5 mm, and preferably about 25 μm to 1 mm. In the case utilizing the resin sheet for shaping or molding a tray, the thickness of the resin sheet may for example be about 50 μm to 2 mm, preferably about 50 to 1000 μm (e.g., about 100 to 1000 μm), and more preferably about 130 to 500 μm.

The preferred resin sheet is a sheet having shaping processability (mold-processability), particularly a hydrophobic synthetic resin sheet. Such a sheet may for example comprise an olefinic resin (particularly a polypropylene-series resin), a polyester-series resin (particularly a polyethylene terephthalate-series resin), and a styrenic resin. In particular, a resin sheet having shaping processability, for example, a styrenic resin sheet is preferred. Incidentally, a polystyrene sheet has high transparency.

The styrenic resin includes a homopolymer containing an aromatic vinyl monomer (e.g., styrene, vinyltoluene, α-methylstyrene) as a constitutive component, a copolymer of an aromatic vinyl monomer and a copolymerizable monomer, and a mixture thereof. More specifically, examples of the styrenic resin include a general-purpose polystyrene (GPPS), a rubber-reinforced (or rubber-containing) polystyrene (high impact polystyrene: HIPS), a polystyrene-polybutadiene-polystyrene block copolymer, an acrylonitrile-styrene copolymer (AS resin), an acrylonitrile-butadiene-styrene copolymer (ABS resin), a styrene-butadiene block copolymer, an AXS resin obtained by graft-polymerizing acrylonitrile (A) and styrene (S) to a rubber component (X) (e.g., an acrylic rubber, a chlorinated polyethylene, an ethylene-propylene rubber (EPDM), an ethylene-vinyl acetate copolymer), a styrene-methyl methacrylate copolymer, an acrylonitrile-styrene-methyl methacrylate copolymer, and others. The styrenic resin(s) may be used singly or in combination.

The resin sheet may comprise various additives, for example, a stabilizer (e.g., an antioxidant, a ultraviolet ray absorbing agent, a heat stabilizer), an antistatic agent, a crystal nucleus-growing agent, a hydrocarbon-series polymer, a plasticizer, a mineral oil, a filler, a coloring agent, and others.

The resin sheet may be obtained by a conventional manner, for example, a conventional film-forming method such as a T-die or inflation method. The resin sheet may be a non-oriented (or drawn) sheet, and is preferably an oriented (or drawn or stretched) sheet. The oriented film may be a uniaxially oriented film, and is preferably a biaxially oriented film. Moreover, if necessary, the oriented film may be heat treated (or may be subjected to heat set treatment). The drawing method includes a conventional drawing or stretching method, for example, roll stretching, press stretching, belt stretching, tenter stretching, tube stretching and a combination method thereof. The draw ratio may be suitably set depending on property of sheet to be desired, and may for example be about 1.2 to 20, preferably about 1.5 to 15, and more preferably about 1.5 to 10.

The surface of the resin sheet may be subjected to a conventional finishing method, for example, corona discharge treatment, high-frequency treatment, and others. The surface tension of the resin sheet depends on the species of sheet, and cannot be generalized as a specific value. In the case measuring in accordance with JIS (Japanese Industrial Standards) K-6768 "Wetting test of a polyethylene and polypropylene film", the surface tension is about 30 to 65 dyn/cm ($30 \times 10^{-5}$ N/cm to $65 \times 10^{-5}$ N/cm). In the case of the styrenic resin, the surface tension is about 40 to 62 dyn/cm ($40 \times 10^{-5}$ N/cm to $62 \times 10^{-5}$ N/cm), preferably about 42 to 62 dyn/cm ($42 \times 10^{-5}$ N/cm to $62 \times 10^{-5}$ N/cm), and more preferably about 45 to 60 dyn/cm ($45 \times 10^{-5}$ N/cm to $60 \times 10^{-5}$ N/cm).

The treating the resin sheet surface having such a surface tension with the surface-treating agent improves adhesiveness of the coating membrane, and durability of the coating membrane of the sheet surface to water-exposure. Incidentally, when the surface tension of the sheet surface is too large, blocking tends to occur probably because the sheet surface is too activated. Accordingly, it is difficult to roll up the rolled sheet. Moreover, when a plurality of shaped trays are stacked to punch out, each tray is contacted to the adjacent one, and as a result working efficiency for separating trays to store a content in the tray tends to be adversely affected.

The coated resin sheet of the present invention, on which the coating layer is formed, has the following properties: the external appearance of the surface is excellent; even in the case rolling up, deterioration of anti-fogging property is small; the antistatic property is high; and in addition high anti-fogging and antiblocking properties are ensured even by deep-draw molding. Moreover, even in the case subjecting to mold-processing (fabrication), the coated resin sheet can hold high anti-fogging property. Further, the amount of stain to a molding machine caused by the anti-fogging agent can be reduced.

The surface-treating agent of the present invention has such a characteristic that high anti-fogging and antiblocking properties are shown even at a small coating amount. Therefore, the coating amount of the surface-treating agent (coating amount after drying) may for example be selected from a wide range of about 5 to 150 mg/m$^2$, and may be usually about 10 to 100 mg/m$^2$, preferably about 15 to 80 mg/m$^2$ (e.g., about 20 to 70 mg/m$^2$), and more preferably about 20 to 50 mg/m$^2$. Even when the coating amount is about 10 to 50 mg/m$^2$, high anti-fogging and antiblocking properties are realized.

In the coated resin sheet of the present invention, at least one side of the resin sheet may be treated with the surface-treating agent, or one side of the resin sheet may be treated (or coated) with the surface-treating agent and the other side may be treated (or coated) with various treating agents (e.g., a coating agent containing an antiblocking agent for improving antiblocking property, an antistatic agent or a lubricant for increasing antistatic property or slipping property, or other agents). In particular, the coating layer comprising a surface-treating agent may be formed on one side of the resin sheet and the release layer (or antiblocking layer) may be formed on the other side.

The release layer (or antiblocking layer) may comprise a variety of mold-releasing agents (or antiblocking agent), for example, a wax (including a mineral-series wax, a plant-series wax, a synthetic wax, and others), a higher fatty acid amide, etc., and preferably comprises at least the silicone oil. The preferred release layer may comprise at least an ether-series hydrophilic polymer having an oxyethylene unit, and a silicone oil. Incidentally, as the silicone oil and the ether-series hydrophilic polymer having an oxyethylene unit, there may be used a silicone oil (for example, dimethylpolysiloxane) and an ether-series hydrophilic polymer (e.g., a nonionic surfactant, e.g., a polyoxyethylene-polyoxypropylene block copolymer, a nonionic surfactant having an oxyethylene unit) as described above.

In the preferred embodiment, the silicone oil may be used in an emulsion (aqueous emulsion) form as described above. Moreover, the ether-series hydrophilic polymer may comprise at least one member selected from the group consisting of a polyoxyethylene-polyoxypropylene block copolymer, and a nonionic surfactant having an oxyethylene unit, and usually comprises at least the block copolymer.

In the mold-releasing agent, the proportion of the ether-series hydrophilic polymer may be selected from such a range that anti-fogging property or antiblocking property is adversely affected, for example, a range of about 0 to 1000 parts by weight relative to 100 parts by weight of the silicone oil. The proportion may be usually about 10 to 500 parts by weight, preferably about 20 to 200 parts by weight (e.g., about 50 to 150 parts by weight), more preferably about 30 to 100 parts by weight (e.g., 50 to 100 parts by weight) relative to 100 parts by weight of the silicone oil.

Incidentally, the treating agent such as a mold-releasing agent may comprise various additives, for example, a stabilizer (e.g., an antioxidant, a ultraviolet ray absorbing agent), a filler, a coloring agent, an antistatic agent, a flame retardant, a lubricant, a wax, an antiseptic agent, a viscosity adjustment (or viscosity controller), a thickening agent, a leveling agent, an antifoaming agent, and others. Moreover, the treating agent may be usually employed in a form such as coating liquid or an impregnating liquid, and may be a nonaqueous liquid composition containing an organic solvent as a solvent. The treating agent may be usually utilized as an aqueous composition. Incidentally, in the aqueous composition, the solvent may be water alone, or a mixed solvent of water and a hydrophilic solvent described above (particularly a water-miscible solvent).

The coating amount of the treating agent (coating amount after drying) may be selected from a wide range of about 1 to 200 mg/m$^2$ (e.g., about 5 to 100 mg/m$^2$) depending on the species of treating agent, and may be usually about 2 to 100 mg/m$^2$, preferably about 3 to 50 mg/m$^2$ (e.g., about 5 to 30 mg/m$^2$), and more preferably about 5 to 25 mg/m$^2$.

The coated resin sheet may be produced by applying or coating the surface-treating agent (or anti-fogging agent) on at least one side of the resin sheet. Moreover, the coated resin sheet may be also produced by applying or coating the surface-treating agent on at one side of the resin sheet and applying or coating the treating agent (e.g., a mold-releasing agent, an antiblocking agent) on the other side of the resin sheet. In the coating of the surface-treating agent (or treating agent), a conventional coating manner, e.g., a spray, a roll coater, a rotogravure roll coater, a knife coater, a dip coater, or others may be utilized. Incidentally, if necessary, the surface-treating agent (or treating agent) may be coated over multiple times. The coated layer (or anti-fogging layer) or treated layer (e.g., a mold-releasing layer) may be formed by coating the surface-treating agent (or treating agent) on the resin sheet, and then usually drying the coated layer.

The coated resin sheet may be successively subjected to a post-treatment step (e.g., a tray-shaping step), and is often rolled up in a roll form and then subjected to a post-treatment step. Even though such a roll-up step, the resin sheet is significantly prevented from transferring of the anti-fogging component depending on high antiblocking property, is excellent in anti-fogging property at high-temperature as well as anti-fogging property at low temperature, and maintains high anti-fogging property over a long period. Further, the resin sheet can be prevented from tack or whitening, and keeps transparency or luster thereof. Therefore, the resin sheet can be utilized for various applications, for example, a cover sheet (or film), a packaging sheet (or film) such as a food packaging sheet, and others. The coated resin sheet using a resin sheet having high formability (or shapability) has high secondary shapability, and is suitable for mold-processing (or fabrication) of a tray or others.

[Tray and Production Process Thereof]

The present invention also discloses a shaped article such as a tray or a container (e.g., a tray for food packaging) formed (or molded) with the coated resin sheet. By treatment with the surface-treating agent, anti-fogging property may be imparted to the surface of the shaped article (e.g., a tray). Moreover, the tray usually has at least a tray body for storing a content such as food, and the opening of the tray body may be covered with a wrapping film. Further, the tray may comprise a tray body and a cover for covering the opening of the tray body through a hinge. Such a shaped article may be produced by coating the surface-treating agent of the present invention on at least the inner face of the tray body with spray pump or other means. Moreover, in the shaped article having a cover, the inner face of the cover may be also treated with the surface-treating agent.

In the preferred method, the tray (e.g., a tray for storing a content containing water, such as a food packaging tray) is formed with the coated resin sheet (or anti-fogging sheet) by a conventional heat forming (or shaping) method in many cases. As the heat forming (or molding) method (or secondary mold-processing method), for example, a blow molding, a vacuum molding, a pressure molding (e.g., a heat and pressure molding such as a heating mode pressure molding with hot plate, or a radiation heating-mode pressure molding), a vacuum and pressure molding, a plug assist molding, or a matched-mold molding may be utilized. In the case using the oriented resin sheet, the pressure molding with hot plate is often utilized.

According to the present invention, even in the case subjecting the coated resin sheet to such a heat molding (secondary molding), the coated resin sheet can maintain high anti-fogging property and antiblocking property. In particular, even in the case subjecting the coated resin sheet to deep molding, the coated resin sheet is excellent in anti-fogging property at high temperature and anti-fogging property at low temperature, and can maintain high anti-fogging property.

Incidentally, the content storable into the secondary-molded tray is not particularly limited to a specific one. Although the content may be a dried content or a content in which water vaporization is low, the tray is suitable for storing a content containing water (e.g., a food) because of high anti-fogging property. Further, the tray of the present invention is also suitable for a tray to be used under such an environment that dew condensation tends to occur (e.g., a tray for storing a perishable food or prepared food maintained at a low temperature, in addition a cooked food). Incidentally, even in the case subjecting the tray to the heat molding, the tray ensures high transparency and luster, and is excellent in visibility of the content.

According to the present invention, combinations of specific components significantly improve anti-fogging property (high temperature anti-fogging property and low temperature anti-fogging property) and antiblocking property. In particular, even in the case subjecting the sheet of the present invention to roll up or heat molding, the sheet can maintain high anti-fogging property, and can be excellent in mold-releasing property (or antiblocking property). Further, a small amount of the silicone oil imparts high mold-releasing property (or antiblocking property) to the sheet. Moreover, the amount of stain on a molding machine by the anti-fogging agent can be reduced.

EXAMPLES

The following examples are intended to describe this invention in further detail and should by no means be interpreted as defining the scope of the invention. Incidentally, in Examples and Comparative Examples, the following components were used.

[Polyhydric Alcohol Fatty Acid Ester]
    A-1: Sucrose laurate (manufactured by Riken Vitamin Co., Ltd., "RIKEMAL A", HLB=15)

A-2: Polyglycerin fatty acid ester (manufactured by Riken Vitamin Co., Ltd., decaglycerin monolaurate "Poem J-0021", HLB=15.5)

[Non-ether-series Hydrophilic Polymer]

B-1: Polyvinylpyrrolidone (manufactured by BASF Japan Ltd., "Luvitec K-90", weight-average molecular weight=$90\times10^4$ to $150\times10^4$, and viscosity of 5 wt. % aqueous solution=80 to 100 mPa·s)

B-2: Methylcellulose MC (manufactured by Shin-Etsu Chemical Co., Ltd., "METOLOSE SM-100", viscosity of 2 wt. % aqueous solution=80 to 120 mPa·s, mean substitution degree of methyl group=1.8)

B-3: Hydroxypropylmethylcellulose HPMC (manufactured by Shin-Etsu Chemical Co., Ltd., "METOLOSE 60SH-15", viscosity of 2 wt. % aqueous solution=13 to 18 mPa·s, mean substitution degree of methyl group=1.9, and mean substitution degree of hydroxypropyl group=0.25)

B-4: Sodium polyacrylate PAcNa (manufactured by Nippon Shokubai Co., Ltd., "AQUALIC FH-G", weight-average molecular weight=$400\times10^4$ to $500\times10^4$)

B-5: Polyvinyl alcohol PVA (manufactured by Kuraray Co., Ltd., "PVA250", mean polymerization degree=500, saponification degree=86.5 to 89.0%)

[Ether-series Hydrophilic Polymer]

C-1: Polyoxyethylene-polyoxypropylene block copolymer (POE-POP block copolymer) (manufactured by Dai-ichi Kogyo Seiyaku Co., Ltd., "EPAN 785", content of ethylene oxide (EO) chain=85% (wt. %), weight-average molecular weight=13000)

C-2: POE-POP block copolymer (manufactured by Dai-ichi Kogyo Seiyaku Co., Ltd., "EPAN 485", content of EO chain=85% (wt. %), weight-average molecular weight=8000)

C-3: POE-POP block copolymer (manufactured by Dai-ichi Kogyo Seiyaku Co., Ltd., "EPAN 450", content of EO chain=50% (wt. %), weight-average molecular weight=2400)

C-4: POE-POP block copolymer (manufactured by Dai-ichi Kogyo Seiyaku Co., Ltd., "EPAN U108", content of EO chain=80% (wt. %), weight-average molecular weight=17500)

C-5: Polyoxyethylene-added nonionic surfactant [polyoxyethylene (20) sorbitan monolaurate (adduct of methylene oxide (20 mole) to sorbitan monolaurate), manufactured by Kao Corporation, "RHEODOL SUPER TW-L120", HLB=17]

[Silicone Oil]

D-1: Dimethylsilicone aqueous emulsion (manufactured by Shin-Etsu Chemical Co., Ltd., "KM9738", 10000 centistokes=$100\times10^{-4}$ m$^2$/s)

Moreover, (1) the initial properties of a coated resin sheet, (2) the properties of a released coated resin sheet which was rolled up (or pressed) in advance and released, (3) the shapability of a coated resin sheet, and (4) the properties of the shaped article were evaluated as followings.

[Initial Properties of Sheet]

External appearance: The external appearance of the sheet after coating the surface-treating agent was visually observed to evaluate on the basis of the following criteria.

"A": The coating agent is uniformly coated on the sheet without repelling.

"B": The coating agent is nonuniformly coated on the sheet with repelling.

Transparency: On the basis of the haze of the sheet, the transparency was evaluated according to the following criteria.

"A": The haze is less than 2.0%.

"B": The haze is not less than 2.0%.

Static charge half-life period (the time required for half of the surface resistivity): In accordance with JIS L 1094, the static charge half-life period of the coated surface treated with an anti-fogging agent was determined under an environment of a temperature of 25° C. and a humidity of 50% RH, and evaluated based on the following criteria.

"A": The static charge half-life period is less than 5 seconds.

"B": The static charge half-life period is not less than 5 seconds and less than 10 seconds.

"C": The static charge half-life period is not less than 10 seconds and less than 30 seconds.

"D": The static charge half-life period is not less than 30 seconds.

[Properties of Released Sheet Rolled Up in Advance]

A sheet coated with a surface-treating agent was cut into 30 centimeters square. Ten pieces of the sheet were stacked, and pressurized at a temperature of 40° C. for one hour under a load of 10 kgf/cm$^2$ ($\approx$98 N/cm$^2$). Then, the applied pressure was released, and the sheets were separated. The following items were evaluated.

External appearance. The external appearance of the sheet was visually evaluated based on the following criteria.

"A": The sheet is free from whitening, and remains the same as before pressing.

"B": The sheet is whitened, and deteriorates the external appearance compared with that before pressing.

Transparency: On the basis of the haze of the sheet, the transparency was evaluated according to the following criteria.

"A": The haze is less than 3.0%.

"B": The haze is not less than 3.0%.

Anti-fogging property of sheet: The sheet was put on a tray charged with 60° C. water so that the surface of the sheet coated with the anti-fogging agent was faced to the opening of the tray to steam the surface. The sheet was allowed to stand for 2 minutes under a room temperature, and the clouding degree of the sheet was visually observed to evaluate based on the following criteria.

"A": The word "anti-fogging property" having font size 5 can be read.

"B": The word "anti-fogging property" having font size 10 can be read.

"C": The word "anti-fogging property" having font size 14 can be read.

"D": The word "anti-fogging property" having font size 18 can be read.

[Shapability (or Formability)]

The sheet was subjected to a hot plate forming (or shaping) to form a circular cover having 200 mm in diameter and 10 mm in depth (drawing ratio: 0.2), and evaluated about the following items.

Stain on hot plate: On the bases of the number of the shot deteriorating transparency of the tray due to stain on the hot plate, degree of the stain on the tray was evaluated in accordance with the following criteria.

"A": Transparency of the tray is maintained up to 10000 shot.

"B": Transparency of the tray is maintained up to 5000 shot.

"C": Transparency of the tray is maintained up to 3000 shot.

"D": Transparency of the tray is maintained up to 1000 shot.

Stain on metal mold: On the bases of the number of the shot deteriorating the external appearance of the upper area of the cover due to stain on the metal mold, degree of the stain on the tray was evaluated in accordance with the following criteria.

"A": Transparency of the tray is maintained up to 10000 shot.

"B": Transparency of the tray is maintained up to 5000 shot.

"C": Transparency of the tray is maintained up to 3000 shot.

"D": Transparency of the tray is maintained up to 1000 shot.

[Properties of Shaped Article]

The sheet was subjected to a hot plate forming (or shaping) to form a circular cover having 100 mm in diameter and 30 mm in depth (drawing ratio: 0.3), and the circular cover was evaluated about the following items.

Anti-fogging property: The cover was put on a tray charged with 23° C. water, and allowed to stand for 10 minutes under an environment of 5° C. Then, the clouding degree of the cover was visually observed to evaluate based on the following criteria.

"A": The word "anti-fogging property" having font size 5 can be read.

"B": The word "anti-fogging property" having font size 10 can be read.

"C": The word "anti-fogging property" having font size 14 can be read.

"D": The word "anti-fogging property" having font size 18 can be read.

Separability of tray: Twenty (20) pieces of the cover were stacked, and adhered firmly to each other with pressing top and bottom sides by hand. The separability was investigated in the following criteria in manually separating the stacked covers one by one.

"A": The covers are separated smoothly.

"B": The covers are managed to be separated.

"C": The covers are less separable.

"D": The covers are hardly separated from each other.

Examples 1 to 11, and Comparative Examples 1 to 5

Aqueous surface-treating agents (anti-fogging treating agents) containing each component at a proportion (parts by weight) shown in Tables were prepared. In each of Examples and Comparative Examples, a biaxially stretched or oriented polystyrene sheet 0.25 mm thick was subjected to corona discharge treatment for giving a surface tension of 60 dyn/cm (60×10 N/cm), coated with the anti-fogging treating agent, and dried to form a given anti-fogging layer. The results are shown in Table 1 and Table 2.

TABLE 1

|  | Ex. 1 | Ex. 2 | Ex. 3 | Ex. 4 | Ex. 5 | Ex. 6 | Ex. 7 | Ex. 8 | Ex. 9 | Ex. 10 | Ex. 11 |
| --- | --- | --- | --- | --- | --- | --- | --- | --- | --- | --- | --- |
| Polyhydric alcohol fatty acid ester | A-1 100 | A-1 90 A-2 10 | A-1 100 | A-1 100 | A-1 100 | A-1 100 | A-1 100 | A-1 100 | A-1 100 | A-1 100 | A-1 100 |
| Non-ether-series hydrophilic polymer | B-1 10 | B-1 10 | B-1 10 | B-1 15 | B-2 10 | B-3 10 | B-4 10 | B-1 20 | B-1 5 | B-1 10 | B-2 15 |
| Ether-series hydrophilic polymer | C-1 50 | C-1 30 | C-1 30 C-5 10 | C-2 10 | C-2 20 | C-2 50 | C-3 20 | C-3 50 | C-4 20 | C-5 10 | C-5 20 |
| Silicone oil | 10 | 10 | 10 | 20 | 10 | 5 | 10 | 10 | 10 | 10 | 10 |
| Coating amount (mg/m²) | 30 | 35 | 40 | 35 | 25 | 45 | 20 | 50 | 30 | 30 | 35 |
| Initial properties of sheet |  |  |  |  |  |  |  |  |  |  |  |
| External appearance | A | A | A | A | A | A | A | A | A | A | A |
| Transparency | A | A | A | A | A | A | A | A | A | A | A |
| Electrostatic half-life | B | B | A | B | B | B | B | B | B | A | A |
| Properties in shaping (stain on hot plate) | B | B | B | B | A | B | A | B | B | B | B |
| Properties of shaped article (anti-fogging property) | A | A | A | A | B | A | B | A | A | A | A |

TABLE 2

|  | Com. Ex. 1 | Com. Ex. 2 | Com. Ex. 3 | Com. Ex. 4 | Com. Ex. 5 |
| --- | --- | --- | --- | --- | --- |
| Polyhydric alcohol fatty acid ester | A-1 100 | A-1 100 | A-1 100 | A-1 100 | A-1 100 |
| Non-ether-series hydrophilic polymer |  |  |  | B-2 10 | B-5 10 |
| Ether-series hydrophilic polymer |  | C-1 10 | C-3 20 |  | C-1 10 |
| Silicone oil |  | 10 |  | 10 | 10 |
| Coating amount (mg/m²) | 30 | 35 | 35 | 25 | 25 |

TABLE 2-continued

|  | Com. Ex. 1 | Com. Ex. 2 | Com. Ex. 3 | Com. Ex. 4 | Com. Ex. 5 |
|---|---|---|---|---|---|
| Initial properties of sheet | | | | | |
| External appearance | A | A | A | A | A |
| Transparency | A | A | A | A | A |
| Electrostatic half-life | D | C | C | D | C |
| Properties in shaping (stain on hot plate) | D | D | D | B | C |
| Properties of shaped article (anti-fogging property) | D | D | D | C | C |

As apparent from Table 1 and Table 2, the coated resin sheets of Examples are excellent in external appearance and transparence, further excellent in antistatic property, heat shapability, and anti-fogging property of the shaped articles.

Examples 12 to 21 and Comparative Example 6

In each of Examples and Comparative Example, one side of a biaxially stretched polystyrene sheet 0.25 mm thick was subjected to corona discharge treatment for giving a surface tension of 60 dyn/cm ($60\times10^{-5}$ N/cm). Each of aqueous surface-treating agents (anti-fogging agents) containing each component at a proportion (parts by weight) shown in Table 3 was prepared. The surface-treating agent was coated on the side treated by the corona discharge, and dried to form a given anti-fogging layer. Further, the other side of the biaxially stretched polystyrene sheet was subjected to corona discharge treatment for giving a surface tension of 40 dyn/cm ($40\times10^{-5}$ N/cm). Moreover, each of aqueous treating agents (mold-releasing agents) containing each component at a proportion (parts by weight) shown in Table 3 was prepared. The mold-releasing agent was coated on the side treated by the corona discharge, and dried to form a given mold-releasing layer. The results are shown in Table 3.

TABLE 3

|  |  | Ex. 12 | Ex. 13 | Ex. 14 | Ex. 15 | Ex. 16 | Ex. 17 | Ex. 18 | Ex. 19 | Ex. 20 | Ex. 21 | Com. Ex. 6 |
|---|---|---|---|---|---|---|---|---|---|---|---|---|
| Anti-fogging agent | Polyhydric alcohol fatty acid ester | A-1 100 | A-1 90 A-2 10 | A-1 100 | A-1 100 | A-1 100 | A-1 100 | A-1 100 | A-1 100 | A-1 100 | A-1 100 | A-1 100 |
|  | Non-ether-series hydrophilic polymer | B-1 10 | B-1 10 | B-1 10 | B-1 15 | B-2 10 | B-3 10 | B-4 10 | B-1 5 | B-1 10 | B-1 10 | B-5 20 |
|  | Ether-series hydrophilic polymer | C-1 50 | C-1 30 | C-1 30 | C-2 10 | C-2 20 C-5 10 | C-3 50 | C-3 10 | C-4 20 | C-4 10 C-5 10 | C-1 30 | C-4 30 |
|  | Silicone oil | 10 | 10 | 10 | 20 | 10 | 5 | 10 | 10 | 10 | 10 |  |
|  | Coating amount (mg/m²) | 30 | 35 | 40 | 35 | 25 | 45 | 20 | 50 | 50 | 30 | 35 |
| Mold-releasing agent | Ether-series hydrophilic polymer |  | C-1 50 | C-1 100 | C-2 50 | C-2 100 | C-3 500 | C-4 200 | C-4 30 | C-4 30 | C-5 10 | C-4 100 |
|  | Silicone oil | 100 | 100 | 100 | 100 | 100 | 100 | 100 | 100 | 100 | 100 |  |
|  | Coating amount (mg/m²) | 15 | 20 | 25 | 20 | 20 | 20 | 20 | 15 | 15 | 20 | 30 |
| Initial properties of sheet | External appearance | A | A | A | A | A | A | A | A | A | A | A |
|  | Transparency | A | A | A | A | A | A | A | A | A | A | A |
|  | Static charge half-life period | B | B | A | B | B | B | B | B | A | A | B |
| Properties of released sheet rolled up in advance | External appearance | A | A | A | A | A | A | A | A | A | A | A |
|  | Transparency | A | A | A | A | A | A | A | A | A | A | A |
|  | Anti-fogging property of sheet | B | A | A | A | A | A | A | A | A | B | C |
| Shapability | Stain on hot plate | B | B | B | B | A | B | B | B | B | B | C |
|  | Stain on metal mold | A | A | B | A | B | B | B | A | B | B | D |
| Properties of shaped article | Anti-fogging property | B | A | A | A | B | A | B | A | A | B | C |
|  | Separability of tray | A | A | B | A | B | B | B | A | A | A | D |

As apparent from Table 3, the coated resin sheets of Examples are excellent in not only initial properties of the sheets but also properties of released sheets rolled up in advance (particularly anti-fogging property), heat shapability, and properties of the shaped articles (anti-fogging property and separating property).

What is claimed is:

1. A surface-treating agent comprising
   a polyhydric alcohol fatty acid ester,
   a non-ether-series hydrophilic polymer which comprises at least one member selected from the group consisting of a cellulose derivative and a homo- or copolymer of vinylpyrrolidone,
   an ether-series hydrophilic polymer which comprises at least one member selected from the group consisting of a polyoxyethylene-polyoxypropylene block copolymer, and a nonionic surfactant having an oxyethylene unit, and
   a silicone oil which is in the form of a silicone emulsion,
   wherein the proportion of the silicone oil is 1 to 50 parts by weight relative to 100 parts by weight of the polyhydric alcohol fatty acid ester.

2. A surface-treating agent according to claim 1, wherein the polyhydric alcohol fatty acid ester comprises at least one member selected from the group consisting of a sucrose fatty acid ester and a polyglycerin fatty acid ester.

3. A surface-treating agent according to claim 1, wherein the proportions of the non-ether-series hydrophilic polymer, and the ether-series hydrophilic polymer, are 1 to 50 parts by weight, and 5 to 150 parts by weight, respectively, relative to 100 parts by weight of the polyhydric alcohol fatty acid ester.

4. A surface-treating agent according to claim 1 which comprises
   at least one fatty acid ester selected from the group consisting of a sucrose fatty acid ester, and a polyglycerin fatty acid ester,
   a polyvinylpyrrolidone,
   a polyoxyethylene-polyoxypropylene block copolymer, and
   a silicone emulsion,
   wherein the proportions of the polyvinylpyrrolidone, the polyoxyethylene-polyoxypropylene block copolymer, and the silicone emulsion as a solid content are 5 to 25 parts by weight, 20 to 100 parts by weight, and 5 to 25 parts by weight, respectively, relative to 100 parts by weight of the fatty acid ester.

* * * * *